United States Patent [19]

Baskett

[11] 4,401,699

[45] Aug. 30, 1983

[54] SURFACE PROCESSING METHOD

[76] Inventor: Theodore N. Baskett, 9514 Portland Ave., Tacoma, Wash. 98441

[21] Appl. No.: 291,326

[22] Filed: Aug. 10, 1981

Related U.S. Application Data

[62] Division of Ser. No. 196,640, Oct. 14, 1980, Pat. No. 4,305,344.

[51] Int. Cl.³ .......... A23B 4/04

[52] U.S. Cl. .......... 427/445; 51/34 A; 51/50 PC; 51/281 R; 51/325; 427/401

[58] Field of Search .......... 427/421, 445, 401; 118/305, 307, 323; 114/222; 134/123; 51/241 S, 429, 100 R, 50 PC, 34 A, 325, 281 R; 196/640; 125/11 TP, 11 CC

[56] References Cited

U.S. PATENT DOCUMENTS

| | | | |
|---|---|---|---|
| 193,984 | 8/1877 | Megaw | 51/34 A |
| 957,978 | 5/1910 | Meyers | 51/50 PC |
| 1,326,484 | 12/1919 | Doran | 118/304 |
| 1,419,073 | 6/1922 | Norton | 51/34 A |
| 2,282,038 | 5/1942 | Davenport | 125/11 TP |
| 3,286,688 | 11/1966 | Blenman | 118/323 |
| 3,422,827 | 1/1969 | McCulloch | 134/123 |
| 3,619,311 | 11/1971 | Rose | 156/62 |
| 3,623,902 | 11/1971 | Hammelmann | 117/104 |
| 3,864,876 | 2/1975 | Diehn | 51/429 |
| 4,046,095 | 9/1977 | Fike | 114/222 |
| 4,163,455 | 8/1979 | Herbert | 134/167 R |

FOREIGN PATENT DOCUMENTS

| | | | |
|---|---|---|---|
| 8127 | 3/1877 | France | 114/222 |

*Primary Examiner*—Harold D. Whitehead
*Attorney, Agent, or Firm*—Eugene D. Farley

[57] ABSTRACT

A surface processing apparatus and method for painting or otherwise treating variously contoured surfaces. A track includes an elongated pliant beam to which a bending apparatus is attached for the purpose of conforming it to the contour of the surface to be processed. A carriage is mounted on the track for movement along the length thereof and in turn mounts a surface processing tool. The tool is operable to process a strip of the surface adjacent the track. Means is provided for moving the track incrementally along the surface, processing strips sequentially until the entire surface has been processed.

3 Claims, 11 Drawing Figures

FIG. 1
FIG. 3
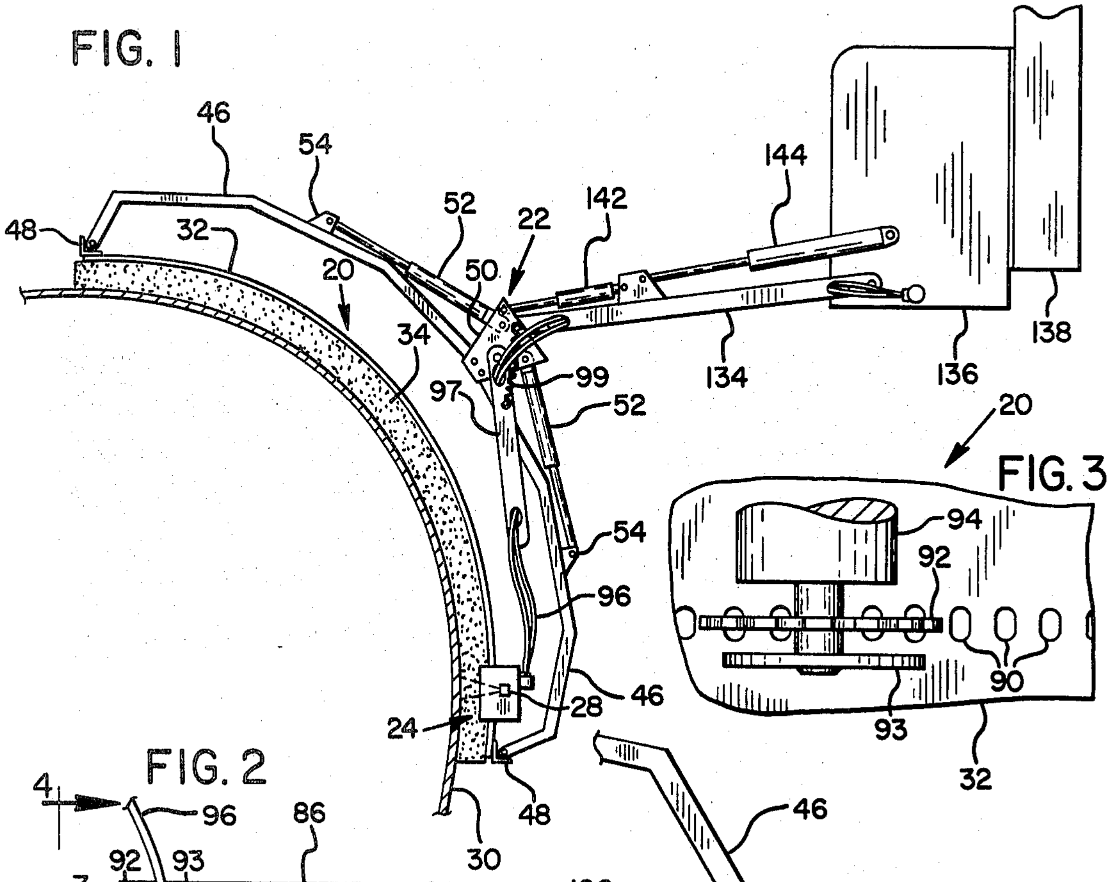
FIG. 2
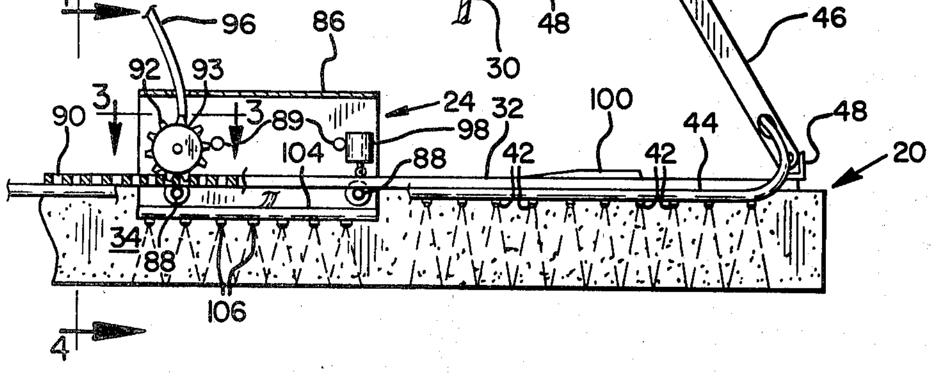
FIG. 4
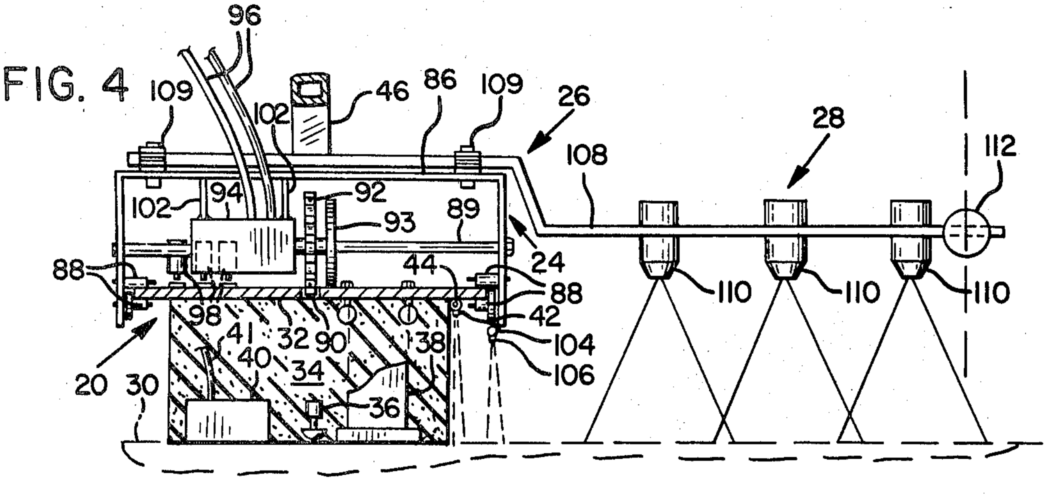

SURFACE PROCESSING METHOD

This application is a division of application Ser. No. 196,640, filed Oct. 14, 1980, now U.S. Pat. No. 4,305,344, dated Dec. 12, 1981.

BACKGROUND OF THE INVENTION

This invention pertains to a surface processing method for treating irregularly contoured surfaces. It pertains particularly to a method involving the application of apparatus which may be curved to fit against the exterior surface of an aircraft fuselage or a similarly curved body for supporting and applying painting or other equipment for maintenance work on the surface.

Previously, maintenance on aircraft fuselages, ship hulls, and the outer skin of other large scale equipment has been accomplished by building scaffolding alongside the equipment so workmen could reach the surface to be cleaned, sanded or painted. Often the routine of repeatedly constructing and dismantling the scaffolding required more time than the actual maintenance operation.

Another approach has been to dangle workmen and their equipment from ropes or cables, or from a boom extending to a point adjacent the surface. Such a procedure is often dangerous as well as laborious.

Other complications arise because such surfaces as are commonly encountered are not planar, but are curved, and often have various curvatures.

Further, health dangers are present due to the use of epoxy paints which, when used, produce solvent vapors and small paint particles or droplets which are hazardous when inhaled. Similar hazards are encountered when sanding or sandblasting.

Accordingly, it is the general object of this invention to provide a flexible track which can be adjusted to substantially assume the contour of a surface to be treated.

Another object is to provide a carriage which will reciprocate along such a track while mounting a surface processing tool, and move the tool along the contour of the surface.

A further object is to simplify sanding or sandblasting such a surface.

Another object is to simplify painting such a surface.

A still further object is to provide means for remotely controlling such surface treating operations to protect the health of the operator.

Another object is to provide equipment which will reduce the time required to sand and paint such surfaces while improving the quality of the work done.

These and other objects and advantages of the present invention will become apparent in the following specification and claims.

SUMMARY OF THE INVENTION

In its basic concept, the surface processing apparatus of the present invention comprises a track including an elongated pliant beam, means to bend the track to the contour of the surface to be treated, and a carriage mounted on the track and operable to support a surface processing tool.

In operation, the track is conformed to the surface to be processed, and the carriage is moved along the track while maintaining the surface processing tool in a position to treat a strip of the surface adjacent the track.

BRIEF DESCRIPTION OF THE DRAWINGS

FIG. 1 is a left side elevation of my surface processing apparatus showing a first embodiment of the track-bending means and a fragmentary section of the work, e.g. an aircraft fuselage to which the apparatus is being applied.

FIG. 2 is a fragmentary side elevation of the track assembly in its flat, or unbent, condition.

FIG. 3 is a fragmentary horizontal section taken along the line 3—3 of FIG. 2.

FIG. 4 is a vertical section of the track taken along the line 4—4 of FIG. 2 showing the carriage mounting a paint spraying apparatus.

DESCRIPTION OF THE PREFERRED EMBODIMENT

Figure 5:
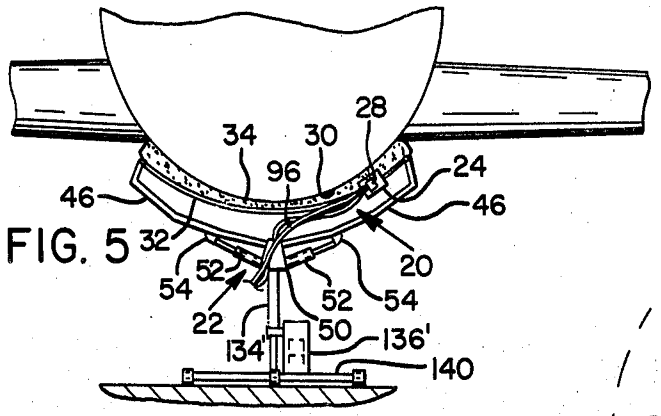
FIG. 5 is an elevation of the surface processing apparatus as it is used on the underside of an aircraft.

As shown in FIG. 1, my surface processing apparatus comprises a track, shown generally at 20, a track-bending means shown in its first embodiment generally at 22, a carriage 24 mounted on the track, and a tool mounting means shown generally at 26, which, in its first embodiment mounts paint spray apparatus 28.

The surface to be treated or processed is shown at 30, and may be the outer skin of an aircraft fuselage as shown here, or the hull of a ship or any similar surface which requires painting or other maintenance. Often such surfaces will have an arcuate contour, although other shapes may be encountered as well.

Track 20 comprises an elongated, pliant beam 32, preferably made of a pliant sheet plastic material such as polypropylene. Such a beam may be curved to various contours, including the contour of surface 30.

Track 20 further preferably includes a resilient pad 34 attached to the face of beam 32 which is to be disposed adjacent to surface 30. The pad is preferably of a porous material such as foam rubber or urethane foam, and is readily curved with the beam to conform to the contour of the surface to be processed.

As shown in FIG. 4, track 20 may also include a proximity detecting means such as electrical switch 36 for sensing when the track comes in contact with surface 30. The proximity detecting means is preferably located in resilient pad 34 adjacent surface 30.

Also, track 20 may include one or more magnets 38, preferably electromagnets, mounted on beam 32 adjacent surface 30. They serve to lock the track in place against a ferromagnetic surface such as is commonly encountered, for instance, in ship hulls.

Another component of track 20 is one or more air flotation pads shown at 40. Air is supplied to the pads through a hose 41. The pads are operable to support or hover the track adjacent surface 30.

As best shown in FIGS. 2 and 4, the track assembly preferably also includes a plurality of air jets 42 on a hose 44 mounted along one side of beam 32 for directing a curtain or shield of air toward the surface 30 to be processed. The air curtain protects track 20 from particulates and vapors resulting from the surface processing operation.

The track-bending means is shown in its first embodiment at 22 in FIG. 1. It comprises a caliper-like clamp having a pair of legs 46, one attached to each end of beam 32. The legs are hinged at one end to angle brackets 48 which are mounted on the beam. The other ends of the legs are hinged to a central frame 50.

A motor means, preferably a pair of hydraulic cylinders 52 mounted between frame 50 and mounting brackets 54 on legs 46, is operable to apply pressure to close the clamp and thus bend beam 32. Pressure applied to the beam in this manner will cause it to assume the desired or predetermined arcuate contour.

Figure 8:
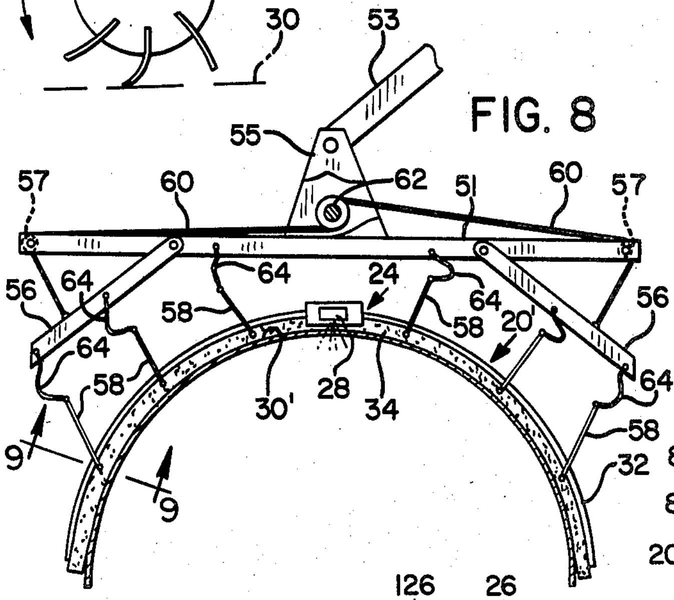
FIG. 8 is an elevation of my surface processing apparatus showing a second embodiment of the track-bending means.

A second embodiment of the bending means is shown in FIG. 8. Track 20' is shown resting on a large arcuate surface 30'. The natural shape of the track is a downwardly opening arc which conforms substantially to the arcuate surface.

An overhead boom 53 pivotally mounts a frame plate 55 which is centrally attached to an elongated support bar 51. A pair of levers 56 are hinged on the support bar and are angled downwardly therefrom.

Pulleys 57 are mounted at each end of the support bar and a set of cables 60 extend around the pulleys and down to suspend the levers at a variable angle from the support bar. The other ends of the cables are attached to a winch means 62 mounted on the frame plate.

Figure 9:
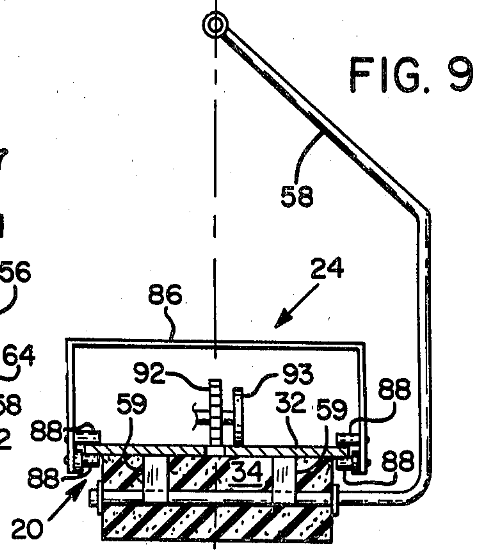
FIG. 9 is a view of the track and attachment assembly looking in the direction of the arrows of line 9—9 of FIG. 8.

Depending from support bar 54 and levers 56 are a plurality of flexible members 64. They each support a hook 58, as shown in FIGS. 8 and 9. The hooks extend around the track, preferably through resilient pad 34 and connect to the underside of beam 32 by pillow blocks 59.

This embodiment of the bending means is thus able to bend track 20' away from surface 30' by lifting support bar 54 and levers 56. Since the track is of a predetermined weight it deflects a predetermined amount when thus supported from overhead.

Figure 10:
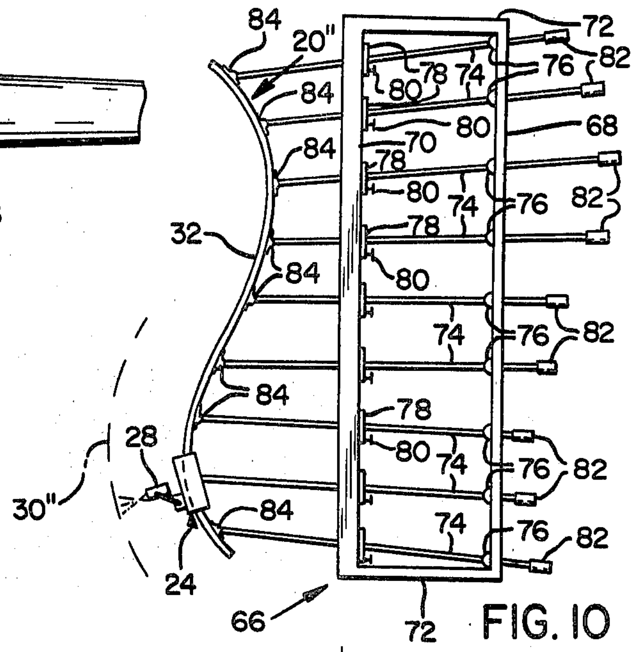
FIG. 10 is an elevation of my surface processing apparatus showing a third embodiment of the track-bending means.

A third embodiment of the bending means is illustrated in FIG. 10. A frame, shown generally at 66, is positioned a predetermined distance away from the surface to be processed. The frame comprises two upright members 68 and 70, spaced apart from each other by end members 72.

A plurality of rods 74 extend through the frame, mounting on the upright members. The rods are threaded and are thus able to engage a threaded nut 76 which is hinged to upright member 68. They are thus able to move in the plane of the frame, as well as longitudinally by rotating the rod.

Each rod is also mounted on upright member 70. A guide 78 for each rod is clamped to the upright member. Each guide has a hole therein for supporting the rod in a loose sliding relationship. The guide can be moved along upright member 70 and clamped at various positions by tightening a thumbscrew 80. Thus, each rod may be angled variously through the frame.

On one end of each rod 74 is a head 82 for turning the rod. The other ends of the rods are attached to track 20'' by swivel ball joints, shown at 84. By screwing the rods in and out the track thus may be bent to parallel the surface to be processed, shown at 30''. It should be noted that a resilient pad 34 is not required in this embodiment.

Carriage 24 is shown best in FIGS. 2 and 4. It generally comprises a housing 86 which is mounted to roll along beam 32, supported by a plurality of small rollers 88. A pair of shafts 89 are mounted adjacent the pairs of rollers and space the side walls of the carriage apart.

Beam 32 includes a rack, preferably comprising a plurality of holes 90 extending the length of the beam as shown in FIG. 3. These holes are engaged by a sprocket wheel 92. The sprocket wheel is preferably mounted resiliently on the carriage in line with one set of rollers 88. A support wheel 93, adjacent the sprocket wheel, maintains it a uniform distance from the beam.

As shown in FIG. 4, a motor means drives sprocket wheel 92. The motor means is preferably an air motor 94 powered by air from hoses 96. This allows the surface processing apparatus to be used in an explosive environment or other area where an electrical motor would be undesirable. The motor is mounted on the carriage by resilient support members 102.

Air hoses 96 are attached to carriage 24 and are operable to follow it throughout its traversal. An arm 97 is hinged on frame 50 and is supported by a spring 99 to hold the air hoses taut.

The carriage also preferably includes a plurality of position sensing means such as electric switches 98. The switches are operable to engage cams 100 mounted on the surface of beam 32. The cams are flexible with the track. The switches are preferably mounted over a set of rollers 88 so that they maintain a constant distance from the track. Each switch may control a different function of the surface processing apparatus, and as many switches as necessary may be employed.

An air curtain traveling with the carriage is generated by a hose 104 connected to air supply hoses 96, mounted on carriage 24, and having a plurality of air jets 106. This air curtain keeps particulates and vapors from the surface processing operation away from the track and carriage and serves as an extra barrier in addition to the stationary air curtain formed by the air from jets 42.

Carriage 24 may support any of a number of different kinds of surface processing tools. An example of such tools is a paint spraying apparatus 28 as illustrated in FIG. 4. A tool mounting means such as arm 108 is mounted on the carriage by bolts 109 and extends outwardly therefrom. It mounts at least one, preferably a plurality, of paint spray nozzles 110. Each of the nozzles is spaced apart from one another and from the carriage and track. At the end of the arm is mounted a line-up marker 112 for helping the operator align the track.

Figure 7:
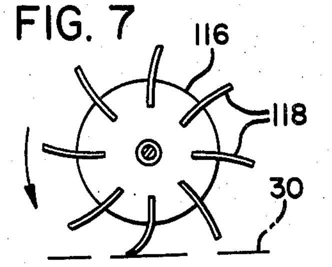
FIG. 7 is an end view of the sanding apparatus of FIG. 6.
Figure 6:
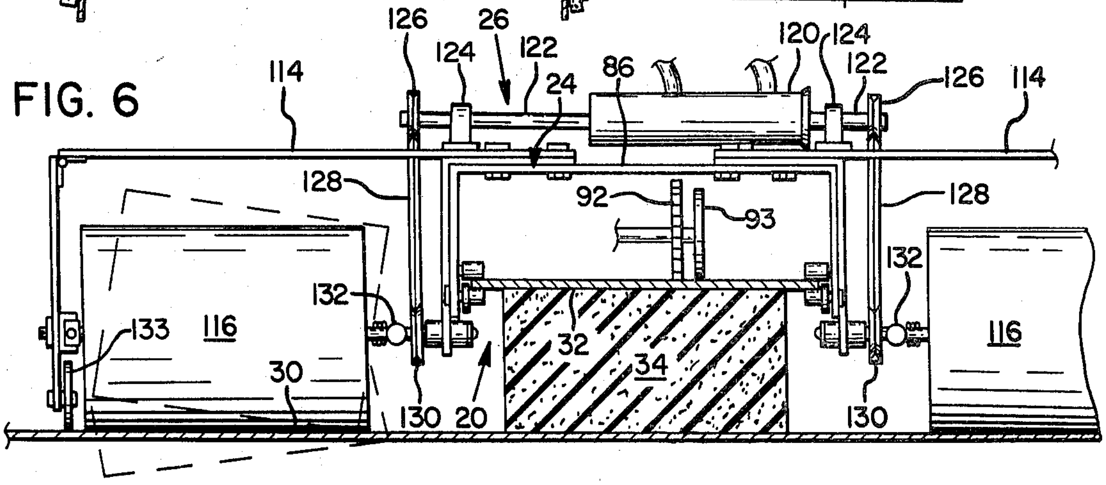
FIG. 6 is a view similar to FIG. 4 showing the carriage mounting a sanding apparatus.

Another example of a surface processing tool is the sanding apparatus shown in FIGS. 6 and 7. A tool mounting means comprising frame 114 is mounted on the carriage and supports a rotatable drum 116. A plurality of flexible abrasive strips 118 extend radially from the drum as shown best in FIG. 7.

A motor means, preferably an air motor 120, is mounted on the carriage and is operable to drive the drum through shaft 122, supported by bearings 124, and driving pulley 126. A belt 128 is attached to the driving pulley and powers a driven pulley 130. The driven pulley connects through a universal joint 132 to the drum. The drum is supported on the frame so that it is able to move up and down to accommodate minor surface irregularities. Wheel 133 supports the outer end of frame 114 and tracks the surface.

Preferably, two such sanding apparatus are attached to carriage 24, one on either side thereof. Both can be driven by the same motor 120.

As shown in FIG. 1, a boom 134 mounts track 20 from an operator's booth 136. The operator's booth is movable along a wall 138 for substantially the length of the surface to be processed. Hydraulic cylinders 142 and 144 are controllable to alter the angle of the boom and the orientation of track 20 to maneuver it against the surface to be processed.

An alternate embodiment is illustrated in FIG. 5. Track 20 is mounted by a boom 134' to reach the undersurface of an object such as an aircraft. Operator's booth 136' and the boom assembly ride on a dolly 140, and the operator accordingly is able to control the dolly's movement as well as that of the surface processing apparatus.

Figure 11:
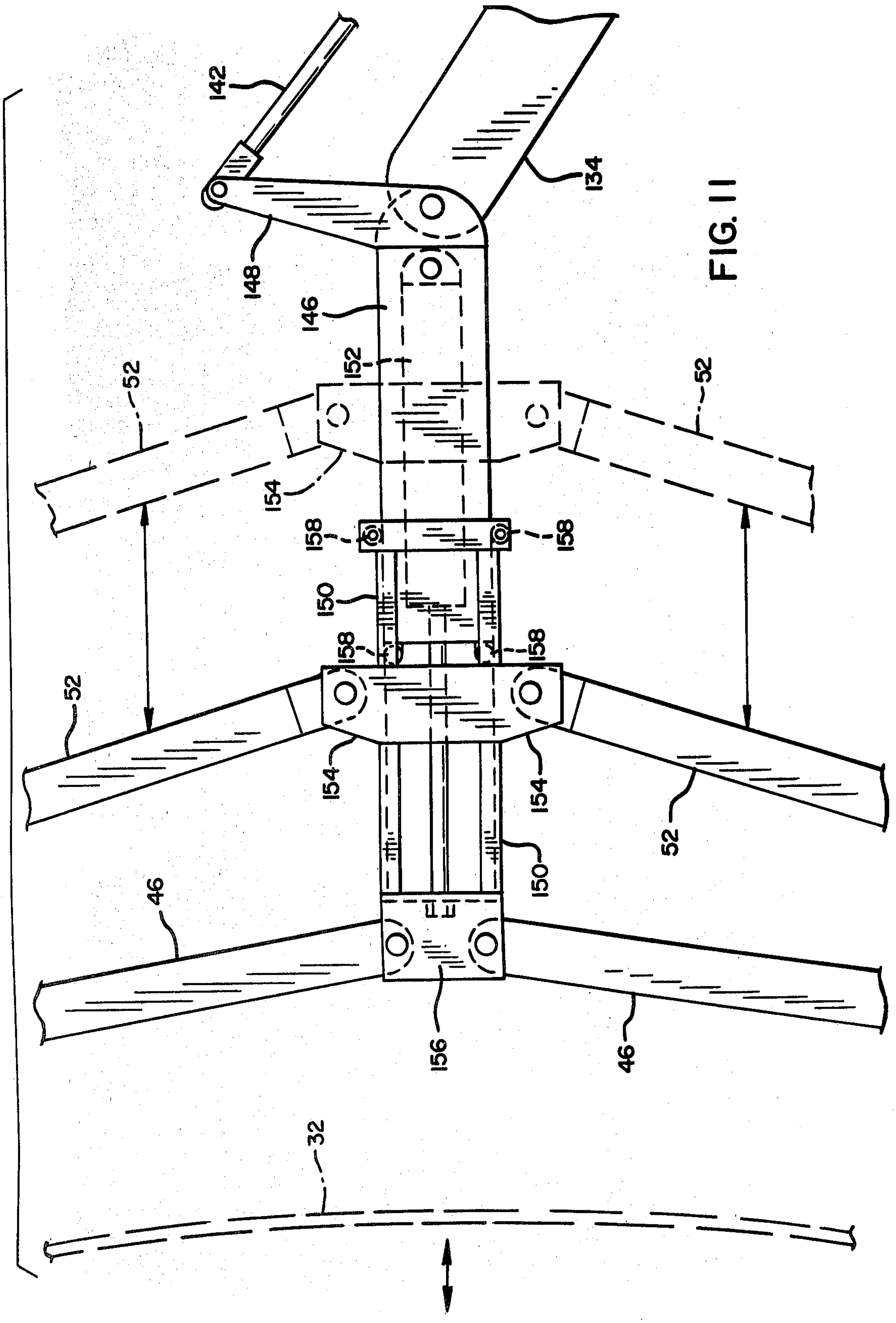
FIG. 11 is a fragmentary elevation of a boom extending means used in the first embodiment of my invention.

An alternate embodiment of central frame 50 is shown in FIG. 11.

A boom extension apparatus includes a square tube 146 pivoted on the end of boom 134. An arm 148 extends from the tube and mounts one end of hydraulic cylinder 142. A sliding frame 150 is mounted to reciprocate on the tube.

A motor means, preferably an hydraulic cylinder 152 inside the tube interconnects the tube and the sliding frame. Mounted on the sliding frame are ears 154 which in turn mount hydraulic cylinders 52. The end of the sliding frame 156 mounts the legs of the caliper-like clamp 46. Thus the sliding frame is operable to move back and forth on the square tube rolling on a plurality of cam followers 158. This allows track to be retracted away from the surface while maintaining the curvature of beam 32.

OPERATION

A piece of equipment, such as an aircraft, having a surface 30 in need of refinishing is preferably brought into a bay adjacent my surface processing apparatus. The operator of the apparatus then maneuvers track 20 adjacent the surface to be processed and adjusts the curvature of the track to conform to the curvature of surface 30.

A surface processing tool such as a sander or a sandblasting apparatus is mounted on carriage 24.

The operator, from his remote control booth 136, starts operation of the surface processing tool, and at the same time initiates the traversal of carriage 24 along track 20.

When carriage 24 approaches the end of track 20, position sensing means 98 is activated to stop the carriage or reverse its direction.

After one strip of surface 30 has been processed, the operator retracts the track slightly, advances operator's booth 136, and then reapplies the track against the surface. If the contour of the surface changes, the operator readjusts the curvature of the track. Proximity switches 36 are useful for this operation. Then the processing operation is re-initiated.

The previously described abrasion operation is repeated as necessary until the surface is thoroughly cleaned. Then a paint spray apparatus is attached to the carriage and a similar surface processing sequence is performed.

During these operations, the air curtains formed by air from jets 42 and 106 keep particulate and vapor material resulting from the surface processing operation away from the track and especially from resilient pad 34.

For the under side of the equipment an apparatus such as is illustrated in FIG. 5 may be used. Likewise, for the top of the equipment the apparatus of FIG. 8 may be used. For non-arcuate contours the apparatus of FIG. 10 may best be employed.

It can be seen from the foregoing description that a useful and efficient apparatus is provided for rapidly processing variously contoured surfaces, the operator remotely controlling the apparatus from a safe distance away from the surface processing tool.

I claim:

1. A method of processing variously contoured surfaces, comprising placing against the surface to be processed an elongated, pliant carriage support member and bending the support member to conform to the contour of the surface to be processed, moving a carriage along the bent support member at a substantially uniform spacing from the surface to be processed and treating the surface with a surface processing tool attached to the carriage.

2. The method of processing variously contoured surfaces of claim 1 wherein the step of treating the surface comprises sanding the surface.

3. The method of processing variously contoured surfaces of claim 1 wherein the step of treating the surface comprises applying paint thereto.

* * * * *